United States Patent [19]

Sato et al.

[11] Patent Number: 4,894,781
[45] Date of Patent: Jan. 16, 1990

[54] COMMUNICATION CONTROL SYSTEM

[75] Inventors: Yoshihisa Sato, Nagoya; Susumu Akiyama, Kariya; Yuji Hirabayashi, Aichi; Katsuhiro Ina, Okazaki; Katsunori Ito, Aichi; Takao Saito, Nagoya; Tetsuo Tanigawa, Toyota, all of Japan

[73] Assignee: Nippondenso Co., Ltd., Aichi, Japan

[21] Appl. No.: 103,271

[22] Filed: Oct. 1, 1987

[30] Foreign Application Priority Data

Oct. 2, 1986 [JP] Japan ................. 61-234778

[51] Int. Cl.⁴ .................. G06F 15/16; G05B 15/02
[52] U.S. Cl. ................. 364/431.11; 364/431.04; 364/551.01
[58] Field of Search .......... 364/431.04, 431.11, 364/431.12, 551, 551.01; 371/9, 11, 12; 123/416, 417

[56] References Cited

U.S. PATENT DOCUMENTS

| | | | |
|---|---|---|---|
| 4,360,874 | 11/1982 | Ohba et al. | 364/431.04 |
| 4,363,097 | 12/1982 | Amano et al. | 364/431.11 |
| 4,527,248 | 7/1985 | Takase et al. | 364/431.04 |
| 4,532,594 | 7/1985 | Hosaka et al. | 364/431.11 |
| 4,556,943 | 12/1985 | Pauwels et al. | 364/431.04 |
| 4,558,416 | 12/1985 | Pauwels et al. | 364/431.11 |
| 4,558,417 | 12/1985 | Akiyama et al. | 364/431.11 |
| 4,598,371 | 7/1986 | DeAngelis et al. | 364/431.04 |
| 4,748,567 | 5/1988 | Sumizawa et al. | 364/431.11 |

FOREIGN PATENT DOCUMENTS 61-202957   9/1986   Japan.

OTHER PUBLICATIONS

"Local Area Network Technology Applied to Automotive Electronic Communications" by Ronald W. Cox, 1985, pp. 71–77.
"A Small Area Network for Cars" by Ronald L. Mitchell, Feb. 1984, pp. 177–184.

Primary Examiner—Parshotam S. Lall
Assistant Examiner—Brian M. Mattson
Attorney, Agent, or Firm—Cushman, Darby & Cushman

[57] ABSTRACT

A plurality of control units are connected via a common signal line through which they communicate. Each control unit is operative to control an apparatus according to certain information the control unit normally receives directly through an exclusive signal line by operation of a directly-inputting device. A check is made to determine whether the directly-inputting device is operating normally. If not, then the required information is inputted from its source indirectly through another control unit by way of the common signal line.

7 Claims, 3 Drawing Sheets

COMMUNICATION CONTROL SYSTEM

BACKGROUND OF THE INVENTION

This invention relates to a system controlling communication between electronic devices.

In some cases, separate electronic control devices including microcomputers are connected via a common data link to provide communication therebetween. For example, in some modern automotive vehicles, separate microcomputer-based control devices such as an engine control unit, a transmission control unit, and a shock absorber control unit, are connected via a common data link to communicate with each other. In such an automotive communication system, sensors detecting control parameters are generally connected to nearest control units, respectively. Control data signal derived through the sensors are transmitted between the control units via the common data link.

In automotive cases, sensors generating signals desired to undergo quick transmissions and sensors generating essential signals are directly connected to associated control units via additional exclusive lines, respectively. If these direct connections via the exclusive lines fail, a serious problem can arise.

SUMMARY OF THE INVENTION

It is an object of this invention to provide a communication control system enabling reliable data transmission.

In a communication control system of a first aspect of this invention, control units adjust apparatuses in accordance with predetermined information, respectively. The control units are mutually connected via a common signal line to communicate with each other. A direct-inputting device inputs at least one of the predetermined information to at least one of the control units via an exclusive signal line. A check is made as to whether the direct-inputting device is operating normally. When the direct-inputting device is not operating normally, the at least one of the predetermined information is inputted to the at least one of the control units via the common signal line.

In a communication control system for a vehicle according to a second aspect of this invention, an engine control computer and a second control computer mounted on the vehicle are linked via a communication network. A sensor outputs a signal representing an engine control parameter. An exclusive signal line connects the sensor and the engine control computer to allow the signal to be directly inputted to the engine control computer. The sensor and the second computer are connected to feed the signal to the second computer. The engine control computer detects a malfunction of the exclusive signal line. When a malfunction of the exclusive signal line is detected, the signal is inputted to the engine control computer via the second computer and via the communication network.

In a communication control system of a third aspect of this invention, a sensor outputs information in an electric signal. A first unit and a second unit are connected. The second unit is connected to the sensor. A structure directly feeds the information from the sensor to the first unit. The information is indirectly fed from the sensor to the first unit via the second unit and via the connection between the first and second units. A determination is made as to whether or not the direct-feeding structure is operating abnormally. When the direct-feeding structure is operating abnormally, the first unit discards the directly-fed information and uses the indirectly-fed information.

DESCRIPTION OF THE BASIC PREFERRED EMBODIMENT

Figure 1:
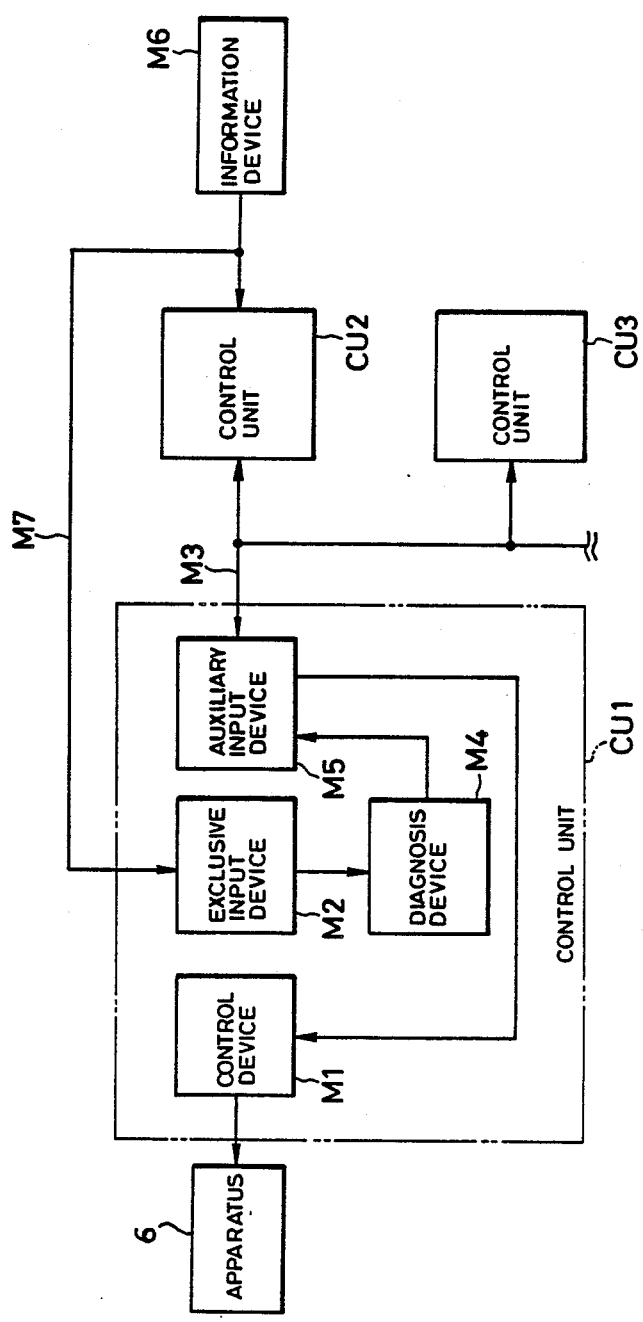
FIG. 1 is a block diagram of a communication control system according to a basic embodiment of this invention.

With reference to FIG. 1, control units CU1, CU2, and CU3 adjusting respective apparatuses 6 (only one shown) are connected via a common data link or common signal line M3 to communicate with each other. Various data signals can be transmitted between the control units CU1–CU3 via the common signal line M3.

The control unit CU1 includes a control device M1 adjusting a controlled apparatus in accordance with an information signal derived through an information device M6. The control unit CU1 also includes an exclusive input device M2 directly connected to the information device M6 via an exclusive signal line M7. In normal cases, the information signal derived through the information device M6 is directly transmitted from the information device M6 to the exclusive input device M2 via the exclusive signal line M7. The exclusive input device M2 generally includes an input interface.

The information device M6 is also connected to another control unit CU2. The information signal derived through the information device M6 can be supplied from the control unit CU2 to the common signal line M3.

A diagnosis device M4 within the control unit CU1 checks whether or not an exclusive input section including the exclusive input device M2 and the exclusive signal line M7 is operating normally. When the exclusive input section is operating normally, the diagnosis device M4 allows the information signal to travel from the exclusive input device M2 to the control device M1. The control device M1 uses the information signal in controlling the associated controlled apparatus. When the exclusive input section is operating abnormally, the diagnosis device M4 disconnects the exclusive input device M2 from the control device M1.

An auxiliary or backup input device M5 within the control unit CU1 is directly connected to the common signal line M3. The auxiliary input device M5 is also connected to the control device M1. When the exclusive input section is operating abnormally, the diagnosis device M4 orders the auxiliary input device M5 to receive the information signal, derived through the information device M6, from the common signal line M3 and to transmit the received information signal to the control device M1. In this way, when the exclusive input section is operating abnormally, the information signal is transmitted from the information device M6 to the control device M1 via the control unit CU2, the common signal line M3, and the auxiliary input device M5.

For example, the information device M6 includes a sensor or another control unit generating an information signal. In automotive cases, the sensor M6 generates a signal representative of a vehicle or engine operating condition, such as a vehicle speed or an engine crank angle.

For example, the diagnosis device M4 checks the exclusive input section by determining whether or not the information signal can be received by the exclusive input device M2 within a preset time interval. The check on the exclusive input section may be performed by comparing the information signals inputted by the exclusive input device M2 and the auxiliary input device M5.

For example, when abnormal operation of the exclusive input section is detected by the diagnosis device M4, the auxiliary input device M5 orders the control unit Cu2 to transmit the information signal via the common signal line M3.

DESCRIPTION OF THE SPECIFIC PREFERRED EMBODIMENT

Figure 2:
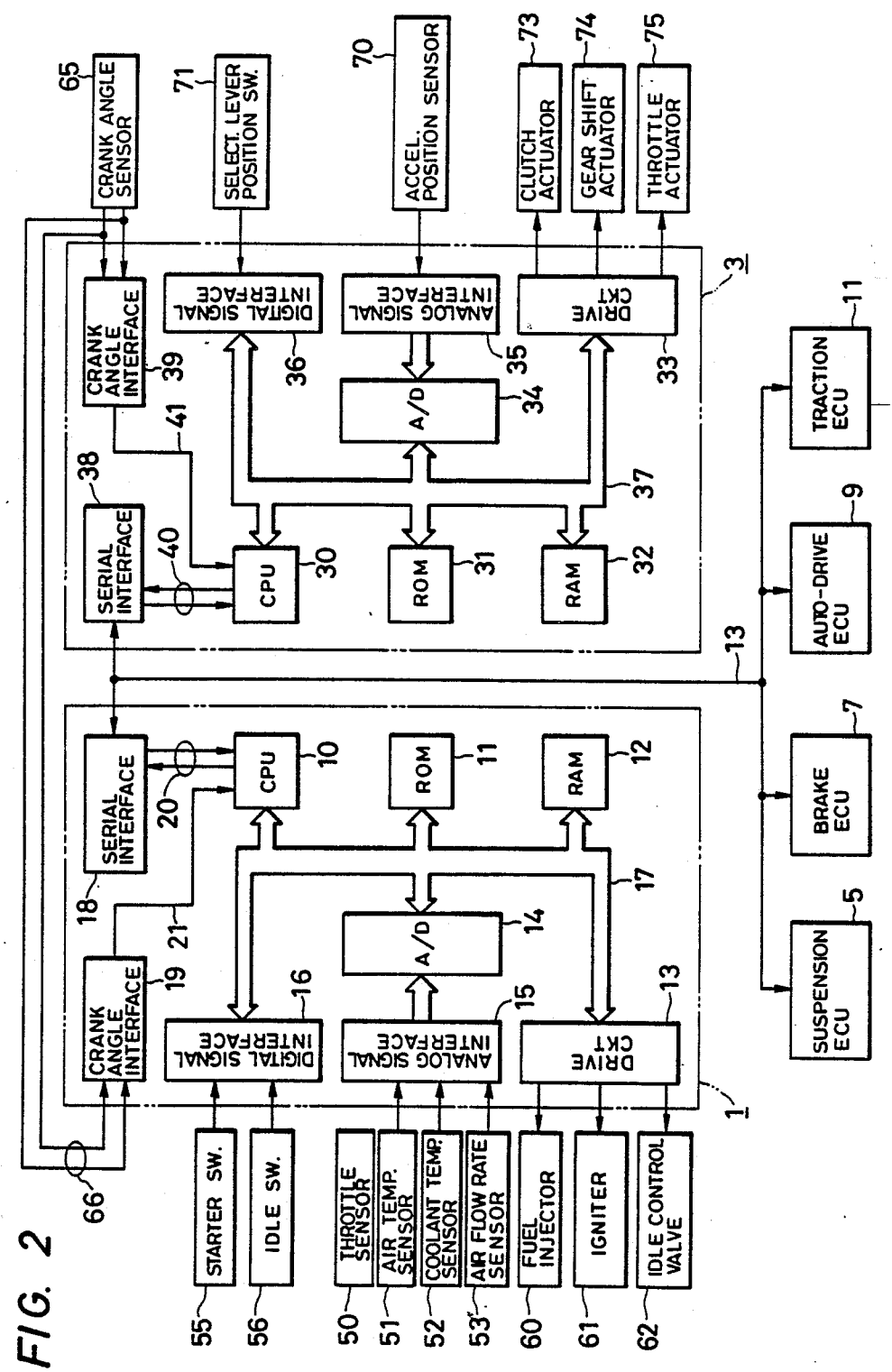
FIG. 2 is a block diagram of a communication control system according to a specific embodiment of this invention.

With reference to FIG. 2, an automotive vehicle is equipped with electronic control units (ECUs), that is, an engine ECU 1, a transmission ECU 3, a suspension ECU 5, a brake ECU 7, an auto-drive ECU 9, and a traction ECU 11, which are mutually connected via a common data link or common signal line 13 to communicate with each other.

Sensors detecting vehicles and engine operating conditions are generally connected to nearest ECUs, respectively. Accordingly, sensor output signals representing vehicle and engine operating conditions are directly supplied from sensors to nearest ECUs. The ECUs convert the respective supplied sensor output signals into suitable corresponding digital signals representing vehicle and engine operating conditions. The ECUs use these digital data signals in controlling respective associated apparatuses. Each of the digital data signals can be transmitted from the directly related ECU or other ECUs via the data communication network 13.

The engine ECU 1 includes a logical operation circuit or microcomputer having a central processing unit (CPU) 10, a read-only memory (ROM) 11, a random-access memory (RAM) 12, an output circuit or drive circuit 13, an analog-to-digital (A/D) converter 14, and a digital signal interface 16 mutually connected via a bus 17. An analog signal interface 15 within the engine ECU 1 is connected to the A/D converter 14.

A throttle opening degree sensor 50, an intake air temperature sensor 51, a coolant temperature sensor 52, and an air flow rate sensor 53 are connected to the analog signal interface 15. A starter switch 55 and an idle switch 56 are connected to the digital signal interface 16. Fuel injectors 60, an igniter 61, and an idle speed control valve 62 are connected to the drive circuit 13.

The engine ECU 1 also includes a serial interface 18 and a crank angle interface 19. The serial interface 18 is coupled to the CPU 10 via a signal line 20. The serial interface 18 is directly connected to the common signal line 13. The CPU 10 of the engine ECU 1 can receive digital data signals from other ECUs via the common signal line 13 and the serial interface 18. The crank angle interface 19 is coupled to the CPU 10 via a signal line 21. The crank angle interface 19 is direcly connected to a crank angle sensor 65 via an exclusive signal line 66. Accordingly, an output signal of the crank angle sensor 65 is directly supplied to the engine ECU 1. Engine rotational speed and reference crank angles for spark timing control are derived from the output signal of the crank angle sensor 65.

The engine ECU 1 optimally controls fuel injection rate and spark timing by adjusting the fuel injectors 60 and the igniter 61 in accordance with crank angle, throttle opening degree, air flow rate, and other engine operating conditions detected by the corresponding sensors. As will be described hereinafter, when the exclusive signal line 66 and the crank angle interface 19 are operating normally, the CPU 10 of the engine ECU 1 derives crank angle data from an output signal of the crank angle interface 10 and uses the derived crank angle data in the fuel injection rate control and the spark timing control. During engine idling operation, the engine ECU 1 regulates engine speed by adjusting the idle speed control valve 62 in accordance with vehicle speed, gear selection lever position, and other vehicle and engine operating conditions detected by the sensors. The engine ECU 1 receives a vehicle speed data signal and a gear selection lever position data signal from the traction ECU 11 and the transmission ECU 3 respectively via the common signal line 13.

The transmission ECU 3 includes a logical operation circuit or microcomputer having a central processing unit (CPU) 30, a read-only memory (ROM) 31, a random-access memory (RAM) 32, output circuit or drive circuit 33, an analog-to-digital (A/D) converter 34, and a digital signal interface 36 mutually connected via a bus 37. An analog signal interface 35 within the transmission ECU 3 is connected to the A/D converter 34.

An accelerator position sensor 70 is connected to the analog signal interface 35. A gear selection lever position switch 71 is connected to the digital signal interface 36. A clutch actuator 73, a gear shift actuator 74, and a throttle actuator 75 are connected to the drive circuit 33.

The transmission ECU 3 also includes a serial interface 38 and a crank angle interface 39. The serial interface 38 is coupled to the CPU 30 via a signal line 40. The serial interface 38 is direcly connected to the common signal line 13. The CPU 30 of the transmission ECU 3 can receive digital data signals from other ECUs via the common signal line 13 and the serial interface 38. The crank angle interface 39 is coupled to the CPU 30 via a signal line 41. Since the transmission ECU 3 is generally closest to the crank angle sensor 65 among the ECUs, the crank angle sensor 65 is connected to the transmission ECU 3, and specifically to the crank angle interface 39 of the transmission ECU 3. The crank angle interface 39 converts an output signal of the crank angle sensor 65 into a suitable corresponding digital data signal, which is applied to the CPU 30. The crank angle digital data signal can be transmitted from the CPU 30 of the transmission ECU 3 to the other ECUs via the serial interface 38 and the common signal line 13.

The transmission ECU 3 controls an automotive automatic transmission by adjusting the gear shift actuator 74 in accordance with accelerator position, brake pedal position, and other vehicle operating conditions detected by the corresponding sensors. The transmission ECU 3 receives a brake pedal position data from the brake ECU 7 via the common signal line 13.

Each of the suspension ECU 5, the brake ECU 7, the auto-drive ECU 9, and the traction ECU 11 includes a logical operation circuit or microcomputer in a manner similar to the engine ECU 1 or the transmission ECU 3.

Figure 3:
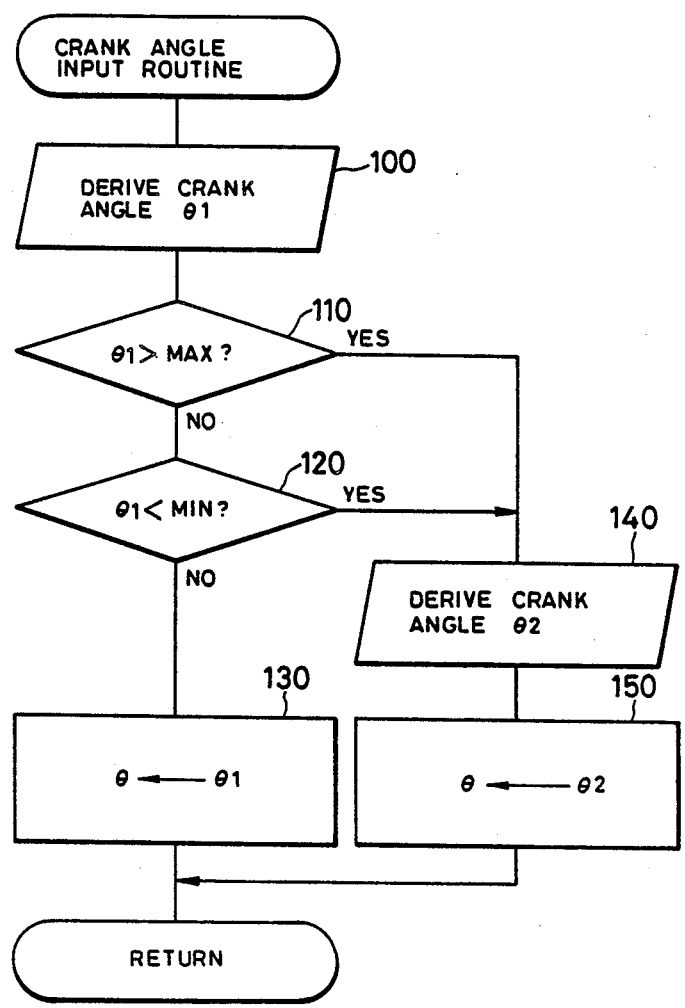
FIG. 3 is a flowchart of a crank angle input routine executed by the engine ECU of FIG. 2.

The engine ECU 1 operates in accordance with a program stored in the ROM 11. The program includes a crank angle input routine which is reiterated at regular intervals through timer-based interruption process. FIG. 3 is a flowchart of the crank angle input routine.

As shown in FIG. 3, a first step 100 of the crank angle input routine derives the current crank angle $\theta 1$ from an output signal of the crank angle interface 19. The output signal of the crank angle interface 10 normally corresponds to the output signal of the crank angle sensor 65 applied to the crank angle interface 19 via the exclusive signal line 66.

A step 110 following the step 100 compares the current crank angle $\theta 1$ with a predetermined reference value MAX corresponding to an upper limit of normal crank angles. When the current crank angle $\theta 1$ is equal to or smaller than the upper limit MAX, the program advances to a step 120. When the current crank angle $\theta 1$ is greater than the upper limit MAX, that is, when the current crank angle $\theta 1$ resides outside a normal range, the program advances to a step 140.

The step 120 compares the current crank angle $\theta 1$ with a predetermined reference value MIN corresponding to a lower limit of normal crank angles. When the current crank angle $\theta 1$ is equal to or greater than the lower limit MIN, the program advances to a step 130. When the current crank angle $\theta 1$ is smaller than the lower limit MIN, that is, when the current crank angle $\theta 1$ resides outside the normal range, the program advances to the step 140.

In the step 130, the value of a variable $\theta$ representing an actual crank angle is set to the current crank angle $\theta 1$. The actual crank angle $\theta$ is stored in the RAM 12 for later use. The actual crank angle $\theta$ is used in controlling the fuel injectors 60, the igniter 61, and the idle speed control valve 62. After the step 130, the crank angle input routine ends and the program returns to a main routine.

The step 140 inputs the crank angle data signal from the common signal line 13 via the serial interface 18 and derives the current crank angle $\theta 2$ from the inputted crank angle data signal. To this end, the CPU 30 of the transmission ECU 3 periodically inputs a crank angle data signal via the crank angle interface 39 and periodically outputs the crank angle data signal to the common signal line 13 via the serial interface 38.

A step 150 following the step 140 sets the actual crank angle $\theta$ to the current crank angle $\theta 2$. The actual crank angle $\theta$ is stored in the RAM 12 for later use. The actual crank angle $\theta$ is used in controlling the fuel injectors 60, the igniter 61, and the idle speed control valve 62. AFter the step 150, the crank angle input routine ends and the program returns to the main routine.

In this way, when the current crank angle $\theta 1$ derived from the output signal of the crank angle interface 19 which normally corresponds to the sensor output signal transmitted via the exclusive signal line 66 resides within the normal range defined between the reference values MAX and MIN, the program advances to the step 130 by which the crank angle $\theta 1$ is used as the actual crank angle $\theta$. When the current crank angle $\theta 1$ derived from the output signal of the crank angle interface 19 which normally corresponds to the sensor output signal transmitted via the exclusive signal line 66 resides outside the normal range, the program advances to the combination of the steps 140 and 150 by which the current crank angle $\theta 2$ derived from the crank angle data signal transmitted via the common signal line 13 is used as the actual crank angle $\theta$ in place of the crank angle $\theta 1$ derived from the output signal of the crank angle interface 19.

In general, the crank angle $\theta 1$ derived from the output signal of the crank angle interface 19 moves out of the normal range when the crank angle interface 19 malfunctions, when the exclusive signal line 66 short-circuits, when the output signal of the crank angle interface 19 is unacceptably contaminated by noises, or when other malfunctons occur.

As understood from the previous description, when a crank angle input section including the exclusive signal line 66 and the crank angle interface 19 is operating abnormally, the engine ECU 1 discards wrong crank angle data derived from the output signal of the crank angle interface 19 and uses accurate crank angle data trasmitted via the common signal line 13. Accordingly, even in such abnormal cases, controls of the fuel injectors 60, the igniter 61, and the idle speed control valve 62 are kept reliable.

The suspension ECU 5 performs suspension control in accordance with vehicle operating condition signals such as a vehicle height signal and a vehicle speed signal. The vehicle height signal is derived via a vehicle height sensor (not shown). The vehicle speed signal is supplied from the brake ECU 7 via the common signal line 13. The suspension control is generally designed to effectively damp shocks to and vibrations of a vehicle body to produce a good ride.

The brake ECU 7 performs vehicle brake control in accordance with vehicle operating condition signals such as a vehicle speed signal and a throttle opening degree signal. The vehicle speed signal is derived via a vehicle speed sensor or a vehicle wheel speed sensor (not shown). The throttle opening degree signal is supplied from the engine ECU 1 via the common signal line 13.

The auto-drive ECU 9 regulates the vehicle speed at a set speed in accordance with vehicle operating condition signals such as a vehicle speed signal and a brake pedal position signal. The vehicle speed signal is derived via the vehicle speed sensor. The vehicle speed sensor is directly connected to the auto-drive ECU 9 via an exclusive signal line so that the vehicle speed signal is directly supplied to the auto-drive ECU 9. The brake pedal position signal is supplied from the brake ECU 7 via the common signal line 13.

During acceleration of the vehicle, the traction ECU 11 performs traction control in accordance with vehicle operating condition signals such as a vehicle speed signal and a brake pedal position signal. The vehicle speed signal is derived via the vehicle speed sensor. The vehicle speed sensor is directly connected to the traction ECU 11 via an exclusive signal line so that the vehicle speed signal is directly supplied to the traction ECU 11. The brake pedal position signal is supplied from the brake ECU 7 via the common signal line 13. The traction control is generally designed to prevent unacceptable slips of vehicle wheels during acceleration of the vehicle.

As described previously, the vehicle speed signal is directly transmitted from the vehicle speed sensor to the auto-drive ECU 9 and the traction ECU 11 via the respective exclusive signal lines. When the vehicle speed derived from the directly transmitted signal resides outside a normal range, the vehicle speed derived from the data signal transmitted via the common signal line 13 is used by the auto-drive ECU 9 and the traction ECU 11 in place of the vehicle speed derived from the directly transmitted signal. It should be noted that the brake ECU 7 outputs the vehicle speed data signal to the common signal line 13.

The crank angle input routine of FIG. 3 may include an additional decision step which determines whether or not the crank angle $\theta 2$ derived in the step 140 resides within a normal range.

The crank angle input routine of FIG. 3 may include an additional decision step which is executed when an ignition switch of the vehicle is turned to an ON position. In this additional decision step, the crank angles $\theta 1$ and $\theta 2$ derived by the steps 100 and 140 are compared to check the crank angle input section including the exclusive signal line 66 and the crank angle interface 19.

The step 140 of FIG. 3 may be modified as follows. The modified step 140 orders the CPU 30 of the transmission ECU 3 to output a crank angle data signal to the common signal line 13 via the serial interface 38. Then, the step 140 orders the serial interface 18 of the engine ECU to receive the crank angle data signal. Finally, the step 140 derives the current crank angle $\theta 2$ from the output signal of the serial interface 18 and sets the actual crank angle $\theta$ to the derived crank angle $\theta 2$. In respect of this modification, the transmission ECU 3 is designed to output the crank angle data signal to the common signal line 13 when the transmission ECU 3 receives an output requirement signal from the engine ECU 1 via the common signal line 13.

What is claimed is:

1. A communication control system comprising:
   a plurality of control means, each controlling a defined number of controlled devices;
   common signal line means for transmitting information between said plurality of the control means;
   wherein said plurality of the control means control the respective controlled devices based on said information transmission via said common signal line means;
   first information generating means for generating first information necessary for control of a first controlled device which is controlled by a first control means among said plurality of the control means;
   exclusive input means inputting the information from the first information generating means via an exclusive signal line;
   wherein the information of the first information generating means is also applied to a second control means among said plurality of the control means;
   wherein said first control means controls said first controlled device based on said information inputted by said exclusive input means;
   wherein said first control means comprises means for judging whether said exclusive input means is operating normally, and controlling means for, when said exclusive input means is not operating in a normal manner, inputting the information of said first information generating means into said controlling means from said second control means via said common signal line means and controlling said first controlled device.

2. The system of claim 1 wherein said judging means comprises means for determining whether the information inputted by said exclusive input means resides within a predetermined normal range.

3. The system of claim 1 further comprising second information generating means for generating second information in said second control means, the second information being necessary for control of said first controlled device, and wherein said first control means receives the information of the second information generating means from said second control means via said common signal line means and controls said first controlled device based on said inputted second information.

4. A communication control system for a vehicle comprising:
   a plurality of control means each controlling a defined number of controlled devices within the vehicle;
   common signal line means for transmitting vehicle condition information between said plurality of the control means;
   wherein said plurality of the control means control the respective controlled devices based on said information transmission via said common signal line means;
   first information generating means for generating first vehicle condition information necessary for control of a first controlled device which is controlled by a first control means among said plurality of the control means;
   exclusive input means inputting the information from the first information generating means via an exclusive signal line;
   wherein the information of the first information generating means is also applied to a second control means among said plurality of the control means;
   wherein said first control means controls said first controlled device based on said information inputted by said exclusive input means;
   wherein said first control means comprises controlling means for judging whether said exclusive input means is operating normally, and means for, when said exclusive input means is not operating normally, inputting the information of said first information generating means into said controlling means from said second control means via said common signal line means and controlling said first controlled device.

5. The system of claim 4 wherein said judging means comprises means for determining whether or not the information inputted by said exclusive input means resides within a predetermined normal range.

6. The system of claim 4 further comprising second information generating means for generating second vehicle condition information in said second control means, the second information being necessary for control of said first controlled device, and wherein said first control means receives the information of the second information generating means from said second control means via said common signal line means and controls said first controlled device based on said inputted second information.

7. The system of claim 4 wherein said first control means comprises means for controlling an engine of the vehicle, and said second control means comprises means for controlling a transmission of the vehicle.

* * * * *